(No Model.)

J. C. TALLMAN.
HORSE TAIL HOLDER.

No. 478,894. Patented July 12, 1892.

Witnesses
Jno. G. Hinkel
H. S. McArthur

Inventor
J. C. Tallman
By Inter & Freeman
Attorneys

UNITED STATES PATENT OFFICE.

JOHN C. TALLMAN, OF BRIDGEPORT, CONNECTICUT.

HORSE-TAIL HOLDER.

SPECIFICATION forming part of Letters Patent No. 478,894, dated July 12, 1892.

Application filed October 29, 1891. Serial No. 410,278. (No model.)

*To all whom it may concern:*

Be it known that I, JOHN C. TALLMAN, a citizen of the United States, residing at Bridgeport, Fairfield county, State of Connecticut, have invented certain new and useful Improvements in Equine-Tail Supporters, of which the following is a specification.

In many cases the tails of horses, instead of occupying a central position upon the body, are naturally curved to one side, and in other cases the tails droop or lie flat against the body when the horse is in motion, both of which are considered serious defects, especially in otherwise fine animals. These defects are corrected in ordinary practice by cutting the muscles of the tail beneath or at one side and maintaining the tail in an upright position by means of cords for several weeks until the cuts are healed. During this time the animal must be swung from an elevated support and is subjected to much pain and discomfort. To avoid these objections I have invented a device or support for the tail during the time it is healing, so constructed as to permit absolute freedom of the movements of the animal and also capable of being used for bitting-gear when desired. The curved support may be constructed and secured to the animal in various ways, one of which is illustrated in the accompanying ings, in which—

Figure 1:
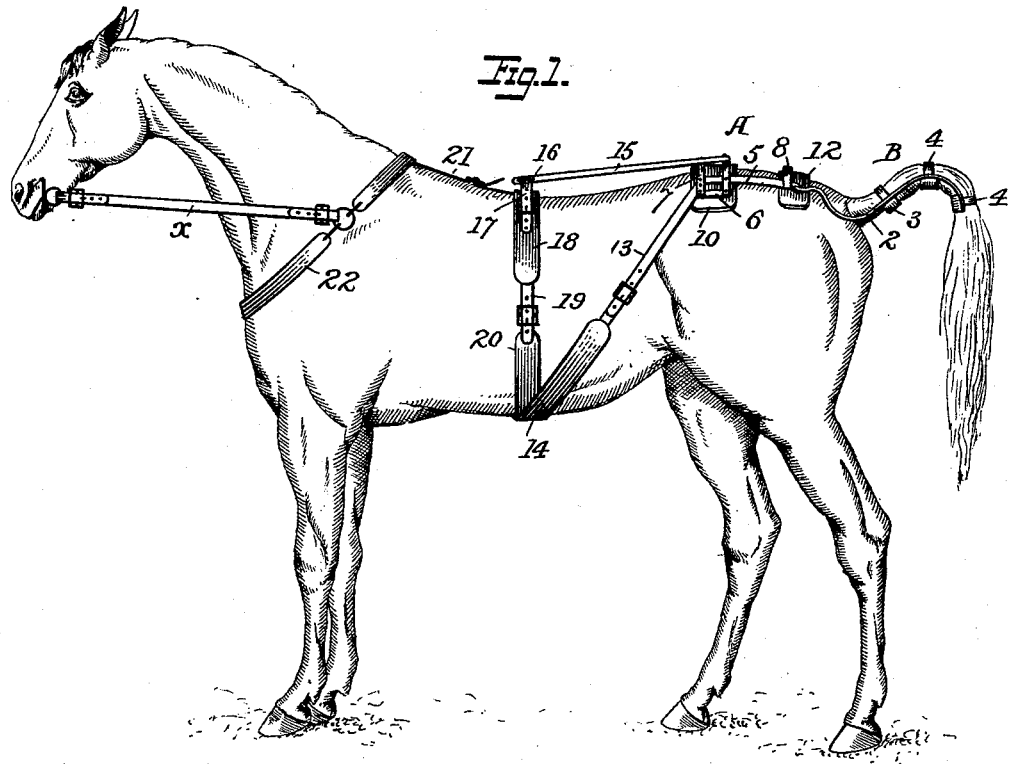
Figure 2:
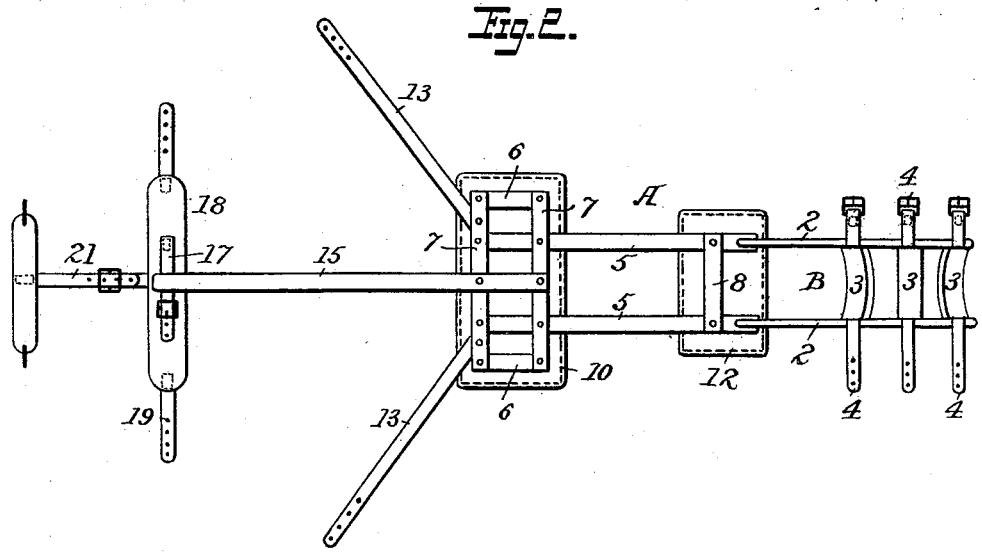

Figure 1 illustrates a device in side view upon an animal. Fig. 2 is a plan view thereof.

The said device consists, essentially, of a frame A, which may be constructed in any suitable manner for the attachment and support of the tail-supporting frame B, which, as shown, is in the form of two curved blades 2 2, arranged parallel to each other to extend on opposite sides of the tail above the junction of the same with the body and having a curvature approximating that in which the root of the tail should be supported during the time it is healing, and a number of connecting cross-pieces 3 3, extending between the blades and preferably padded, so as to constitute an easy support for the root of the tail, and cross-straps 4 4, provided with suitable buckles or fastenings, extend over the tail when the latter lies in the cross-pieces 3 3 and serves to hold the tail in place.

The tail-support proper should be practically inflexible, so as to prevent any movement of the tail, which might defeat the object of the invention.

The frame A may be constructed in any suitable manner to lie upon the back of the animal and serve as an attachment for the support B. As shown, the frame consists of the longitudinal strips 5 5 and shoulder-strips 6 6 and cross-strips 7 7 8, which may be of wood or metal, and beneath which or parts of which are placed pads or sheets 10 12 of leather or other suitable material. The said frame lies directly upon the back of the animal over the hips and is held from turning thereon by the straps 13 13, which are buckled to the ends of belly-bands 14. I prefer to extend a light flexible strip 15 forward from the frame with a slot 16 to receive a cross-strap 17 upon a narrow saddle 18, lying upon the back near the shoulders and connected by straps 19 to a belly-band 20, and a strap 21, extending forward from the saddle 18, may be connected to a breast-strap 22. The said straps hold the forward part of the frame A firmly in place, while the tail, bearing upon the support B, which is carried or supported by the frame, holds the latter in place at the rear. These parts are therefore so firmly supported that the animal may move freely, even to the extent of rolling upon the ground, without displacing or injuring the device. By this means the tail may be supported in any desired position for as long as required, in order to permit the healing of the wounds occasioned in correcting its defective shape or position.

Whenever it is necessary to bit the horse the device described will serve as a bitting-gear, it being necessary only to extend side straps $x$ from the band 22 to the mouth, as usual.

Without limiting myself to the precise construction of parts described, I claim—

1. In a horse-tail holder, the combination of a frame, such as A, and means for holding it in a fixed position upon the back of a horse, with a substantially-inflexible supporting-frame, such as B, rigidly connected to and extending rearwardly from the frame A, and devices for securely holding the tail in the frame B, substantially as described.

2. The combination of a frame, such as A, and means for holding it in a fixed position upon the back of a horse, with a tail-support consisting of curved side strips rigidly connected to the frame and extending rearwardly upon opposite sides of the tail, and cross-pieces and straps upon the curved strips for securely holding the tail, substantially as described.

3. In a tail-support for a horse, the combination of a frame A, the belly-band, the side straps 13 13, connecting the frame with the belly-band, whereby the frame is held from turning upon the horse's back, and the tail-support carried by the frame, substantially as set forth.

4. The combination, in a tail-support for horses, of the frame A, provided with a rod 15, support B, belly-bands, and straps connecting the belly-bands and the frame A, substantially as set forth.

In testimony whereof I have signed my name to this specification in the presence of two subscribing witnesses.

JOHN C. TALLMAN.

Witnesses:
F. W. STEVENS,
CHAS. S. CANFIELD.